(12) United States Patent
Sakano et al.

(10) Patent No.: US 7,803,492 B2
(45) Date of Patent: Sep. 28, 2010

(54) FUEL CELL STACK WITH POSITIONING MECHANISM

(75) Inventors: Masaaki Sakano, Utsunomiya (JP); Masaru Oda, Utsunomiya (JP); Ryugo Suzuki, Nishiibaraki-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 958 days.

(21) Appl. No.: 11/258,577

(22) Filed: Oct. 25, 2005

(65) Prior Publication Data
US 2006/0088752 A1    Apr. 27, 2006

(30) Foreign Application Priority Data
Oct. 25, 2004    (JP) .............. 2004-309720

(51) Int. Cl.
*H01M 8/02*    (2006.01)
*H01M 2/08*    (2006.01)

(52) U.S. Cl. ............... 429/452; 429/467; 429/470; 429/507

(58) Field of Classification Search .............. 429/34–39
See application file for complete search history.

(56) References Cited

U.S. PATENT DOCUMENTS
2002/0146612 A1*  10/2002  Sugiura et al. ............... 429/32

2004/0202916 A1    10/2004  Goto et al.

FOREIGN PATENT DOCUMENTS

| JP | 2000-012067 | 1/2000 |
| JP | 2004-172094 | 6/2004 |
| JP | 2004-281089 | 10/2004 |

OTHER PUBLICATIONS

Japanese Office Action for Application No. 2004-309720, dated Jun. 2, 2009.

* cited by examiner

*Primary Examiner*—Dah-Wei D Yuan
*Assistant Examiner*—Adam A Arciero
(74) *Attorney, Agent, or Firm*—Lahive & Cockfield, LLP; Anthony A. Laurentano, Esq.

(57) ABSTRACT

A fuel cell stack has fuel cell units. Each of the fuel cell units includes first and second membrane electrode assemblies and first to third separators sandwiching the first and second membrane electrode assemblies. A positioning mechanism is used for positioning the first to third separators in alignment with each other. The positioning mechanism includes a first protruded portion and a second protruded portion. The first protruded portion protrudes from one surface of the second separator for positioning the first separator. The second protruded portion protrudes from the other surface of the second separator for positioning the third separator.

5 Claims, 6 Drawing Sheets

FUEL CELL STACK WITH POSITIONING MECHANISM

BACKGROUND OF THE INVENTION

1. Field of the Invention

The present invention relates to a fuel cell stack having a fuel cell unit including at least first and second electrolyte electrode assemblies and at least first to third separators sandwiching the first and second electrolyte electrode assemblies. Each of the first and second electrolyte electrode assemblies includes a pair of electrodes and an electrolyte interposed between the electrodes.

2. Description of the Related Art

For example, a solid polymer electrolyte fuel cell employs a membrane electrode assembly (electrolyte electrode assembly) which includes two electrodes (anode and cathode), and a solid polymer electrolyte membrane interposed between the electrodes. The electrolyte membrane is a polymer ion exchange membrane (proton exchange membrane). The membrane electrode assembly is sandwiched between a pair of separators. The membrane electrode assembly and the separators make up a unit cell for generating electricity.

In the unit cell, a fuel gas such as a gas chiefly containing hydrogen (hereinafter also referred to as the "hydrogen-containing gas") is supplied to the anode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy. A gas chiefly containing oxygen or the air (hereinafter also referred to as the "oxygen-containing gas") is supplied to the cathode. At the cathode, the hydrogen ions from the anode combine with the electrons and oxygen to produce water.

In general, several tens to several hundreds of unit cells are stacked together to form a stack. At this time, the unit cells need to be positioned in alignment with each other accurately. For this purpose, in practice, knock pins are inserted into positioning holes of the unit cells. However, as the increase in the number of the stacked unit cells, the insertion operation of the knock pins becomes difficult, and thus, the fuel cell cannot be assembled efficiently. Further, the positional deviation of the members occurs easily, and the sealing function may not be achieved.

According to the disclosure of Japanese Laid-Open Patent Publication No. 2004-172094, a fuel cell includes an electrolyte electrode assembly and first and second separators sandwiching the electrolyte electrode assembly. The electrolyte electrode assembly includes a pair of electrodes and an electrolyte interposed between the electrodes. The first and second separators have first and second positioning holes, and first and second insulating positioning members are attached to the first and second positioning holes. The outer wall of the second insulating positioning member is fitted to the inner wall of the first insulating positioning member. Thus, the first and second separators are positioned in alignment with each other, while the first and second separators are insulated.

Further, the first insulating positioning member includes a support portion for supporting one surface of the first separator, and an expanded portion fitted to the first positioning hole of the first separator and having the internal wall. The second positioning member includes a support portion for supporting one surface of the second separator, a first expanded portion fitted to the second positioning hole of the second separator, and a second expanded portion expanding toward the side opposite to the first expanded portion, and having the outer wall.

The fuel cell (unit cell) has the electrolyte electrode assembly and the first and second separators sandwiching the electrolyte electrode assembly, and the conventional technique relates to the structure of positioning the first and second separators in alignment with each other.

However, recently, in order to reduce the number of components for reducing the overall size of the fuel cell stack, the so-called skip cooling type fuel cell is adopted. In the skip cooling type fuel cell, each of unit cells is formed by stacking two electrolyte electrode assemblies and three separators alternately. The electrolyte electrode assemblies are sandwiched between the separators. A coolant flow field is formed at each of positions between the fuel cell units. The fuel cell units are stacked together to form a fuel cell stack.

SUMMARY OF THE INVENTION

A main object of the present invention is to provide a fuel cell stack in which at least three separators are positioned in alignment with each other efficiently, and the desired rigidity is achieved.

In the present invention, a fuel cell stack comprises a fuel cell unit and a positioning mechanism. The fuel cell unit includes at least first and second electrolyte electrode assemblies and at least first, second, and third separators. Each of the first and second electrolyte electrode assemblies includes a pair of electrodes and an electrolyte interposed between the electrodes. The first separator and the second separator sandwich the first electrolyte electrode assembly. The second separator and the third separator sandwich the second electrolyte electrode assembly. The positioning mechanism positions the first to third separators in alignment with each other.

The positioning mechanism includes a first protruded portion protruding from one surface of the second separator toward the first separator, a second protruded portion protruding from the other surface of the second separator toward the third separator, a first recess provided on the first separator such that the first protruded portion is fitted to the first recess, and a second recess provided on the third separator such that the second protruded portion is fitted to the second recess.

It is preferable that the first to third separators are first to third metal separators. It is preferable that the first protruded portion and the second protruded portion are made of resin material, and formed integrally with the second metal separator, and it is preferable that surfaces of the first and second recesses are made of resin material, and the first and second recesses are formed integrally with the first and third metal separators. In the structure, the number of components of the positioning mechanism is reduced significantly. The first to third separators can be positioned in alignment with each other simply and rapidly.

Further, since the first and second protruded portions and the inner surfaces of the first and second recesses are made of resin material, the surfaces are slidable. Thus, the first and second protruded portions are fitted to the first and second recesses smoothly and reliably, and the positions where these components are fitted together are insulated desirably.

Further, it is preferable that the size or the shape of the first protruded portion is different from the size or the shape or the second protruded portion. In the structure, the first protruded portion cannot be fitted to the second recess and the second protruded portion cannot be fitted to the first recess. Therefore, the order of the first to third separators is not mistakenly switched. It is possible to reliably prevent mistakes in assembling the first to third separators.

Further, it is preferable that the first and second protruded portions are provided on the positioning member, and the positioning member of one of adjacent fuel cell units has an expanded portion fitted to an opening of the positioning member of the other of the adjacent fuel cell units such that the positioning members are positioned in alignment with each other. In the structure, the adjacent fuel cell units can be positioned in alignment with each other easily and accurately.

In the present invention, the first protruded portion protruding toward the first separator and the second protruded portion protruding toward the third separator are provided on both surfaces of the second separator substantially at the central position of the fuel cell unit. Based on the position of the second separator, the first and third separators on both sides are positioned.

Thus, with simple structure and simple operation, the first to third separators are accurately positioned in alignment with each other. Further, in comparison with the structure in which the protruded portion is formed on the first separator or the third separator, the lengths of the first and second protruded portions are reduced significantly, and the rigidity of the first and second protruded portions is improved effectively.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
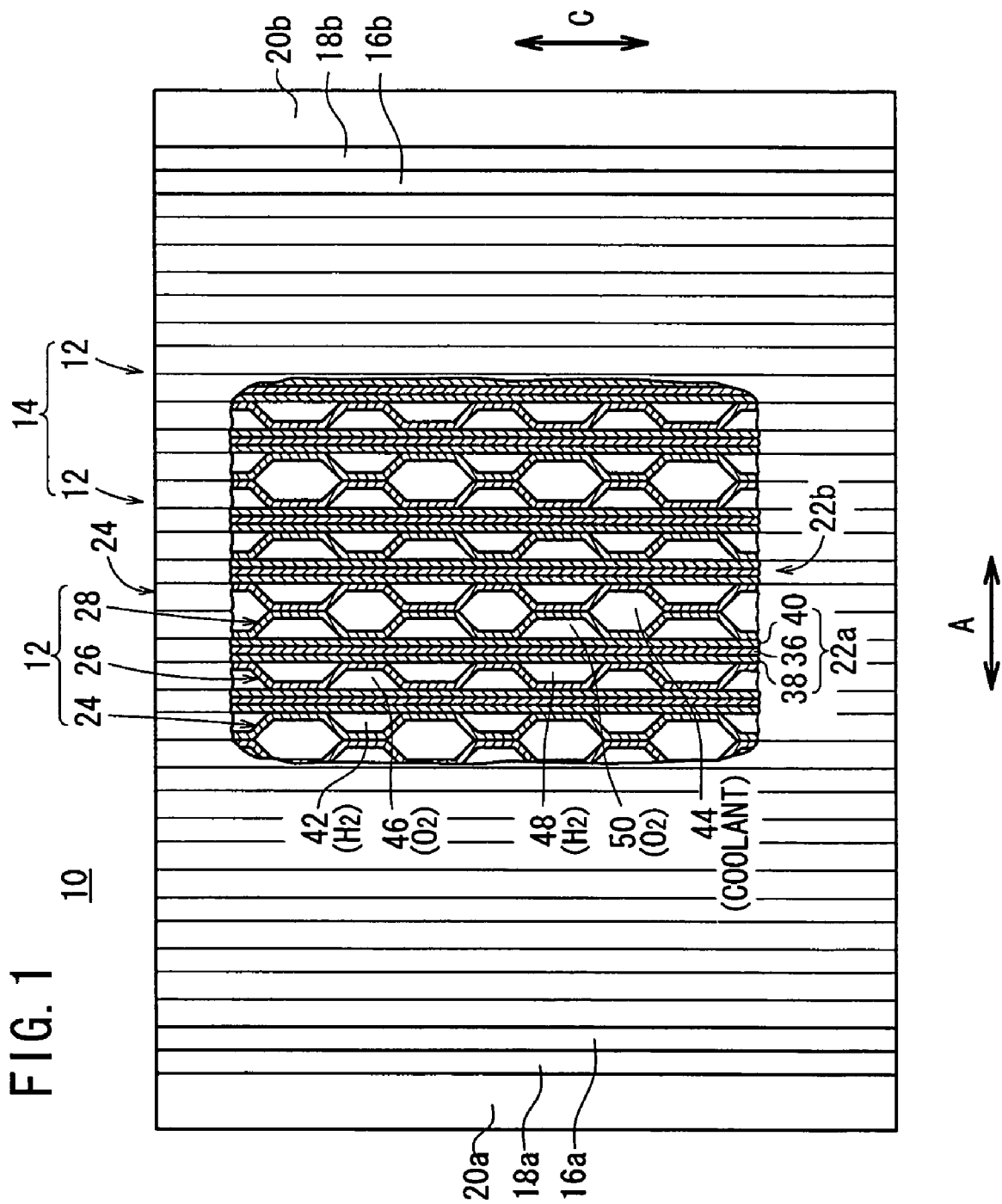
FIG. 1 is a view schematically showing a fuel cell stack according to an embodiment of the present invention.

FIG. 1 is a view schematically showing structure of a fuel cell stack 10 according to an embodiment of the present invention.

The fuel cell stack 10 includes a stack body 14 formed by stacking a plurality of fuel cell units 12 in a direction indicated by an arrow A. At opposite ends of the stack body 14 in the stacking direction, terminal plates 16a, 16b are provided. Insulating plates 18a, 18b are provided outside the terminal plates 16a, 16b. Further, end plates 20a, 20b are provided outside the insulating plates 18a, 18b. A predetermined tightening load is applied to the end plates 20a, 20b for tightening components between the end plates 20a, 20b.

Figure 2:
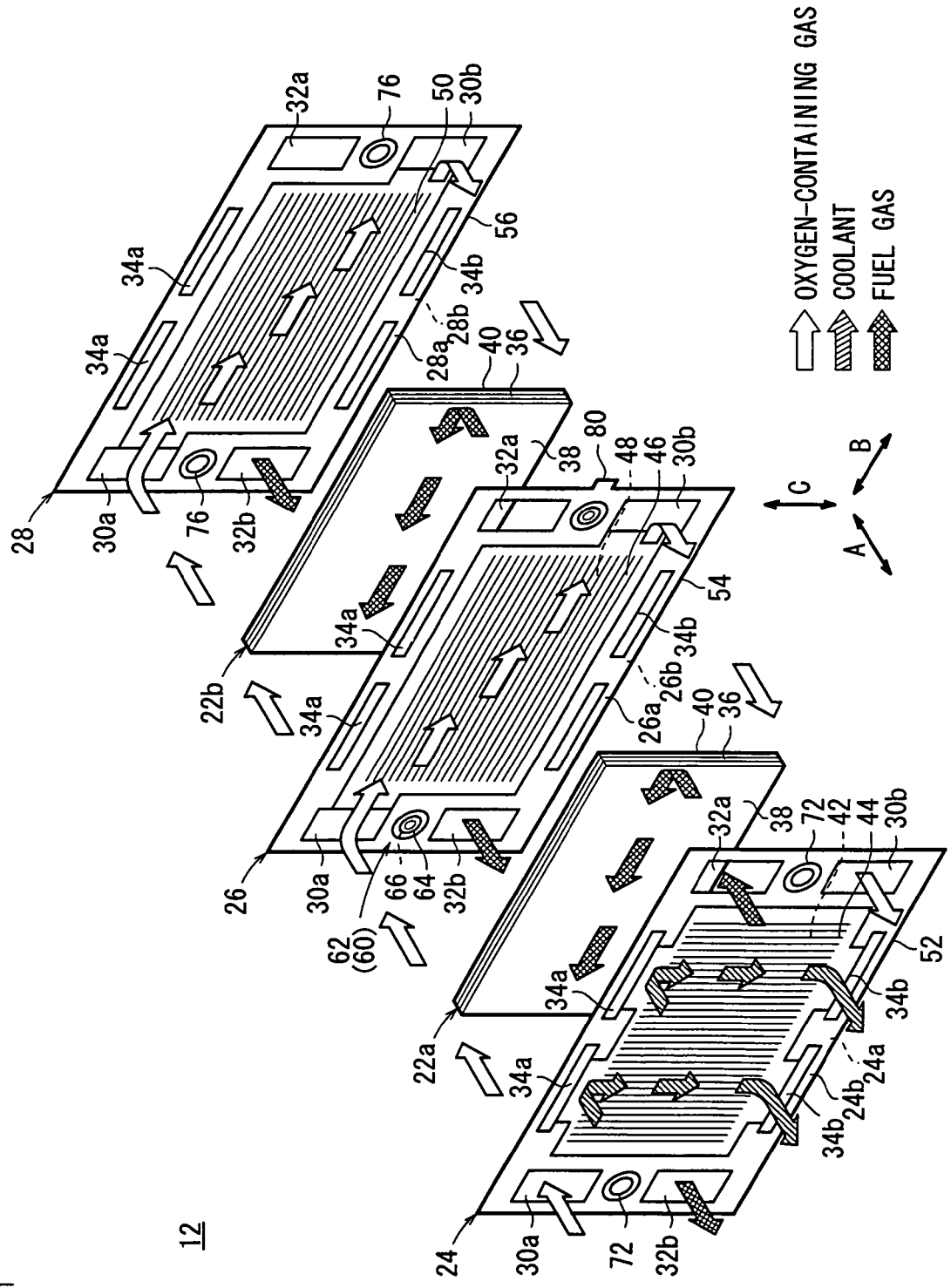
FIG. 2 is an exploded perspective view showing a fuel cell unit of the fuel cell stack.

As shown in FIG. 2, the fuel cell unit 12 includes at least first and second membrane (electrolyte) electrode assemblies 22a, 22b and at least first, second, and third separators 24, 26, 28. The first membrane electrode assembly 22a is sandwiched between the first separator 24 and the second separator 26. The second membrane electrode assembly 22b is sandwiched between the second separator 26 and the third separator 28. The first to third separators 24, 26, and 28 are metal separators. Alternatively, the first to third separators 24, 26, and 28 may be carbon separators.

At one end of the fuel cell unit 12 in a longitudinal direction indicated by an arrow B in FIG. 2, an oxygen-containing gas supply passage 30a for supplying an oxygen-containing gas, and a fuel gas discharge passage 32b for discharging a fuel gas such as a hydrogen-containing gas are provided. The oxygen-containing gas supply passage 30a and the fuel gas discharge passage 32b extend through the fuel cell unit 12 in the direction indicated by the arrow A.

At the other end of the fuel cell unit 12 in the longitudinal direction, a fuel gas supply passage 32a for supplying the fuel gas and an oxygen-containing gas discharge passage 30b for discharging the oxygen-containing gas are provided. The fuel gas supply passage 32a and the oxygen-containing gas discharge passage 30b extend through the fuel cell unit 12 in the direction indicated by the arrow A.

At an upper end of the fuel cell unit 12, coolant supply passages 34a for supplying a coolant are provided, and at a lower end of the fuel cell unit 12, coolant discharge passages 34b for discharging the coolant are provided. The coolant supply passages 34a and the coolant discharge passages 34b extend through the fuel cell unit 12 in the direction indicated by the arrow A.

Each of the first and second membrane electrode assemblies 22a, 22b includes an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example.

Each of the anode 38 and the cathode 40 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

Figure 3:
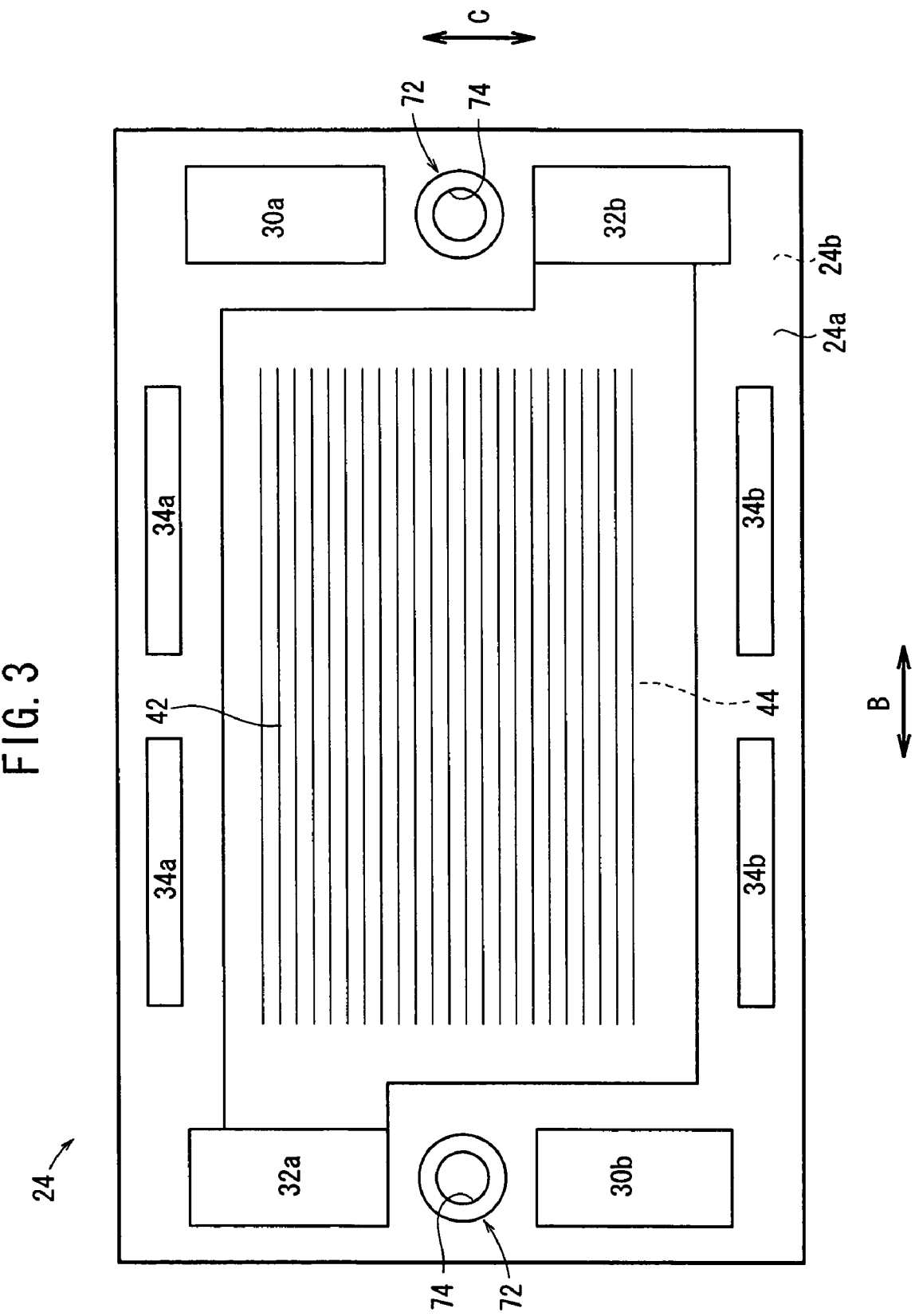
FIG. 3 is a front view showing a first separator of the fuel cell unit.

As shown in FIG. 3, the first separator 24 has a first fuel gas flow field 42 on its surface 24a facing the first membrane electrode assembly 22a. The first fuel gas flow field 42 is connected between the fuel gas supply passage 32a and the fuel gas discharge passage 32b. For example, the first fuel gas flow field 42 comprises a plurality of grooves extending in the direction indicated by the arrow B. Further, as shown in FIG. 2, the first separator 24 has a coolant flow field 44 on a surface 24b. The coolant flow field 44 is connected between the coolant supply passages 34a and the coolant discharge passages 34b. The coolant flow field 44 comprises a plurality of grooves extending in the direction indicated by the arrow C.

The second separator 26 has a first oxygen-containing gas flow field 46 on its surface 26a facing the first membrane electrode assembly 22a. For example, the first oxygen-containing gas flow field 46 comprises a plurality of grooves extending in the direction indicated by the arrow B. The first oxygen-containing gas flow field 46 is connected between the oxygen-containing gas supply passage 30a and the oxygen-containing gas discharge passage 30b. Further, the second separator 26 has a second fuel gas flow field 48 on its surface 26b facing the second membrane electrode assembly 22b. The second fuel gas flow field 48 is connected between the fuel gas supply passage 32a and the fuel gas discharge passage 32b.

The third separator 28 has a second oxygen-containing gas flow field 50 on its surface 28a facing the second membrane electrode assembly 22b. The second oxygen-containing gas flow field 50 is connected between the oxygen-containing gas supply passage 30*a* and the oxygen-containing gas discharge passage 30*b*. When the third separator 28 and the first separator 24 are stacked together, the coolant flow field 44 is formed between the surface 28*b* of the third separator 28 and the surface 24*b* of the first separator 24.

A first seal member 52 is formed integrally on the surfaces 24*a*, 24*b* of the first separator 24 to cover (sandwich) the outer end of the first separator 24. A second seal member 54 is formed integrally on the surfaces 26*a*, 26*b* of the second separator 26 to cover (sandwich) the outer end of the second separator 26. Further, a third seal member 56 is formed integrally on the surfaces 28*a*, 28*b* of the third separator 28 to cover (sandwich) the outer end of the third separator 28.

The fuel cell stack 10 has a positioning mechanism 60 for positioning the first to third separators 24, 26, and 28 of the fuel cell unit 12 in alignment with each other. The positioning mechanism 60 includes a resin positioning members 62, which are integrally formed on the second separator 26 at opposite ends in the direction indicated by the arrow B. As the resin material excellent in insulation, injection molding and hardness, for example, PPS (Polyphenylene Sulfide), LCP (Liquid Crystal Polymer), or the like is used. Further, the same materials as described above can be used as the resin material mentioned in the following description.

After forming and trimming of the metal plate of the second separator 26 are performed, the positioning member 62 and the second seal member 54 are formed integrally on the metal plate substantially at the same time. Alternatively, after the positioning member 62 is formed integrally with the second seal member 54, the positioning member 62 is attached to the metal plate.

Figure 4:
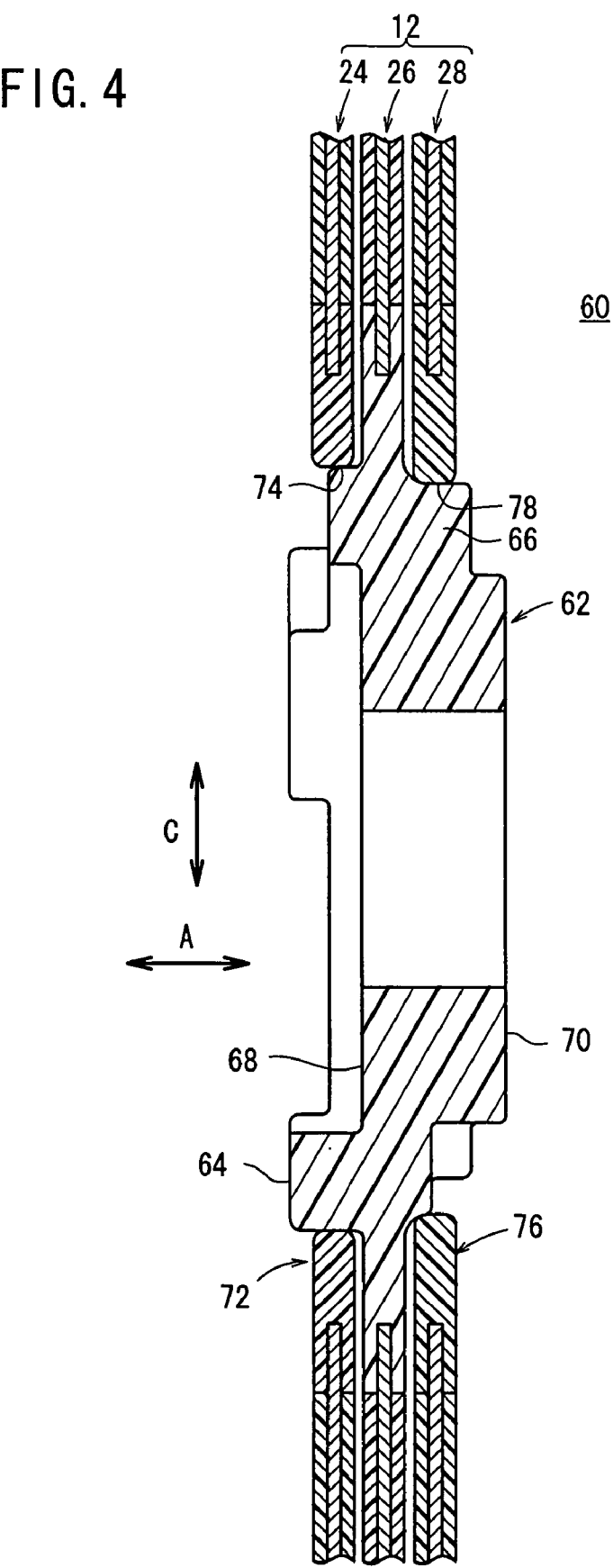
FIG. 4 is an enlarged cross sectional view showing a positioning mechanism for positioning the fuel cell unit.
Figure 5:
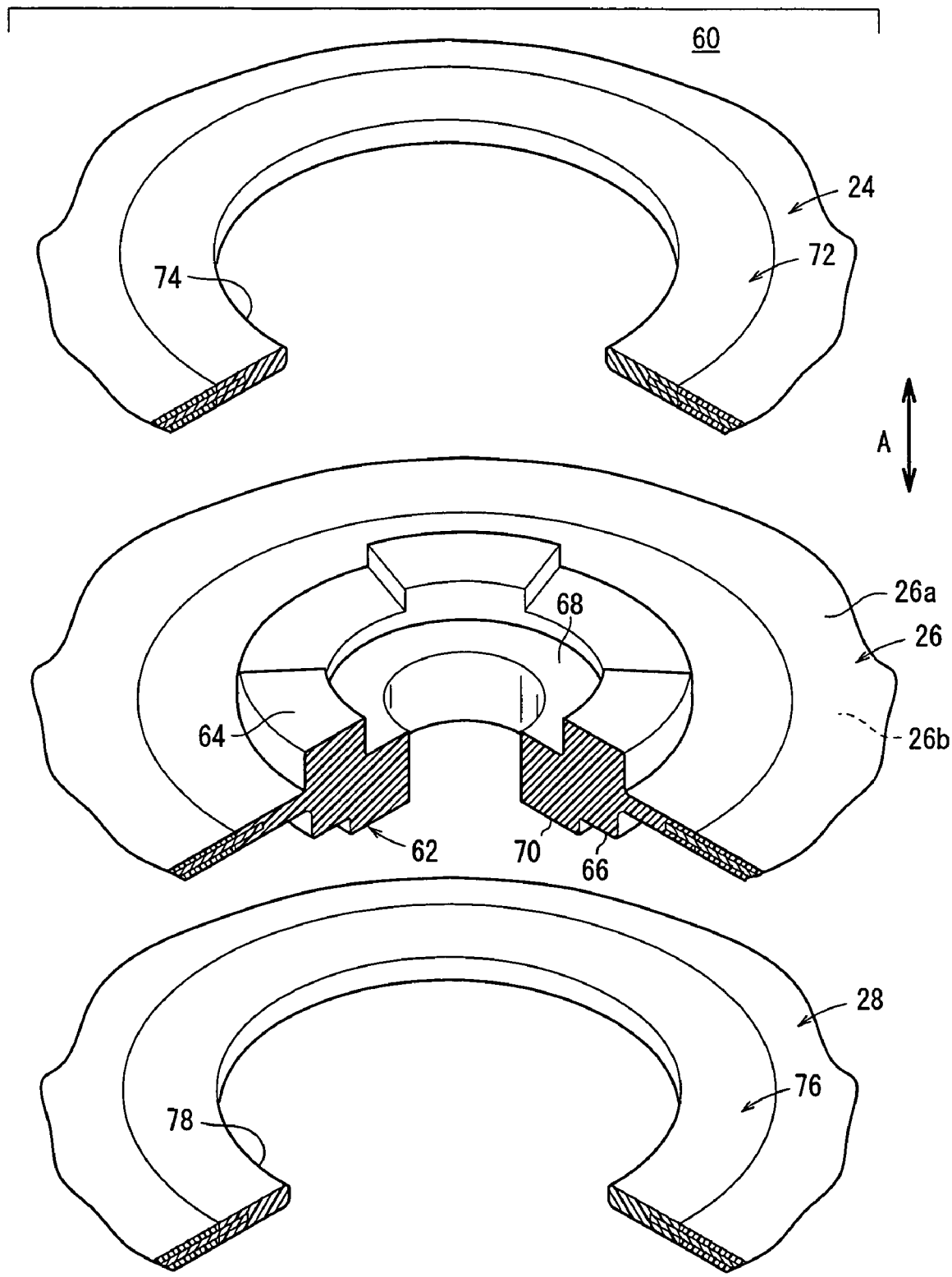
FIG. 5 is an exploded perspective view showing main components of the positioning mechanism.

As shown in FIGS. 4 and 5, the positioning member 62 has a substantially ring shape, and includes a first protruded portion 64 protruding from the surface 26*a* toward the first separator 24, and a second protruded portion 66 protruding from the surface 26*b* toward the third separator 28. For example, the first protruded portion 64 includes three parts formed at three positions, and each part of the first protruded portion 64 is formed by cutting out the ring-shaped portion by a predetermined angle. Likewise, the second protruded portion 66 includes three parts formed at three positions, and each part of the second protruded portion 66 is formed by cutting out the ring-shaped portion by a predetermined angle. The outer diameter of the first protruded portion 64 is larger than the outer diameter of the second protruded portion 66.

The positioning member 62 has a circular hole (opening) 68 on the side of the first protruded portion 64, and an expanded portion 70 on the side of the second protruded portion 66. The expanded portion 70 expands axially in the direction indicated by the arrow A. The expanded portion 70 can be fitted to the hole 68 of another positioning member 62 so that the positioning members 62 can be positioned in alignment with each other.

First ring members 72 are formed integrally on the first separator 24 at opposite ends in the direction indicated by the arrow B (see FIGS. 2 and 3). The first ring member 72 has a first hole (first recess) 74. The first protruded portion 64 of the second separator 26 can be fitted into the first hole 74 (see FIGS. 4 and 5).

Second ring members 76 are formed integrally on the third separator 28 at opposite ends in the direction indicated by the arrow B (see FIG. 2). The second ring member 76 has a second hole (second recess) 78. The second protruded portion 66 of the second separator 26 can be fitted into the second hole 78 (see FIGS. 4 and 5). The diameter of the first hole 74 is larger than the diameter of the second hole 78.

As shown in FIG. 2, a guide 80 is formed integrally with the outer surface of the second separator 26, e.g., at one end in the direction indicated by the arrow B. The material of the guide 80 is the same as the material of the positioning member 62. The guide 80 protrudes outwardly.

Next operation of assembling the fuel cell stack 10 will be described below.

Firstly, in assembling the fuel cell unit 12, the first membrane electrode assembly 22*a* is interposed between the first separator 24 and the second separator 26, and the second membrane electrode assembly 22*b* is interposed between the second separator 26 and the third separator 28 (see FIG. 2). In the state, the first to third separators 24, 26, and 28 are pressed together in the stacking direction indicated by the arrow A.

Thus, as shown in FIGS. 4 and 5, at the positioning member 62 formed integrally with the second separator 26, the first protruded portion 64 is fitted to the first hole 74 of the first ring member 72 formed integrally with the first separator 24. Further, the second protruded portion 66 of the positioning member 62 is fitted to the second hole 78 of the second ring member 76 formed integrally with the third separator 28. In this manner, the first to third separators 24, 26, and 28 are positioned using the positioning mechanism 60, and the fuel cell unit 12 is assembled.

As described above, in the embodiment of the present invention, the first protruded portion 64 and the second protruded portion 66 are provided on both surfaces 26*a*, 26*b* of the second separator 26 at the center of the fuel cell unit 12. Based on the position of the second separator 26, the first and third separators 24, 28 on both sides are positioned. Specifically, the first protruded portion 64 of the second separator 26 is fitted into the first hole 74 of the first separator 24, and the second protruded portion 66 of the second separator 26 is fitted into the second hole 78 of the third separator 28. Thus, in the positioning mechanism 60, with simple structure and simple operation, the first to third separators 24, 26, and 28 are accurately positioned in alignment with each other.

Further, for example, in comparison with the structure in which the protruded portion is formed on the first separator 24 and the protruded portion extends through both of the second and third separators 26, 28, the lengths of the first and second protruded portions 64, 66 in the axial direction are reduced significantly. Thus, the rigidity of the first and second protruded portions 64, 66 is improved effectively, and the positioning accuracy is maintained desirably without any draft angle, flexure, or the like.

In the embodiment of the present invention, the first to third separators 24, 26, 28 are metal separators, and the first ring member 72, the positioning member 62 and the second ring member 76 are made of resin material, and formed integrally on the first to third separators 24, 26, and 28. Therefore, the number of components of the positioning mechanism 60 is reduced significantly, and the positioning operation of the first to third separators 24, 26, and 28 is carried out simply and rapidly.

Further, since the first and second protruded portions 64, 66 and the inner surfaces of the first and second holes 74, 78 are made of resin material, it is possible to achieve the insulating characteristics at the positions where these components are fitted together.

Further, the diameter of the first protruded portion 64 is larger than the diameter of the second protruded portion 66, and the diameter of the opening of the first hole 74 is larger than the diameter of the opening of the second hole 78. Thus, the first protruded portion 64 of the second separator 26 cannot be fitted to the second hole 78 of the third separator 28. Therefore, the order of the first to third separators 24, 26, and 28 is not mistakenly switched. It is possible to reliably prevent mistakes in assembling the first to third separators 24, 26, and 28.

Figure 6:
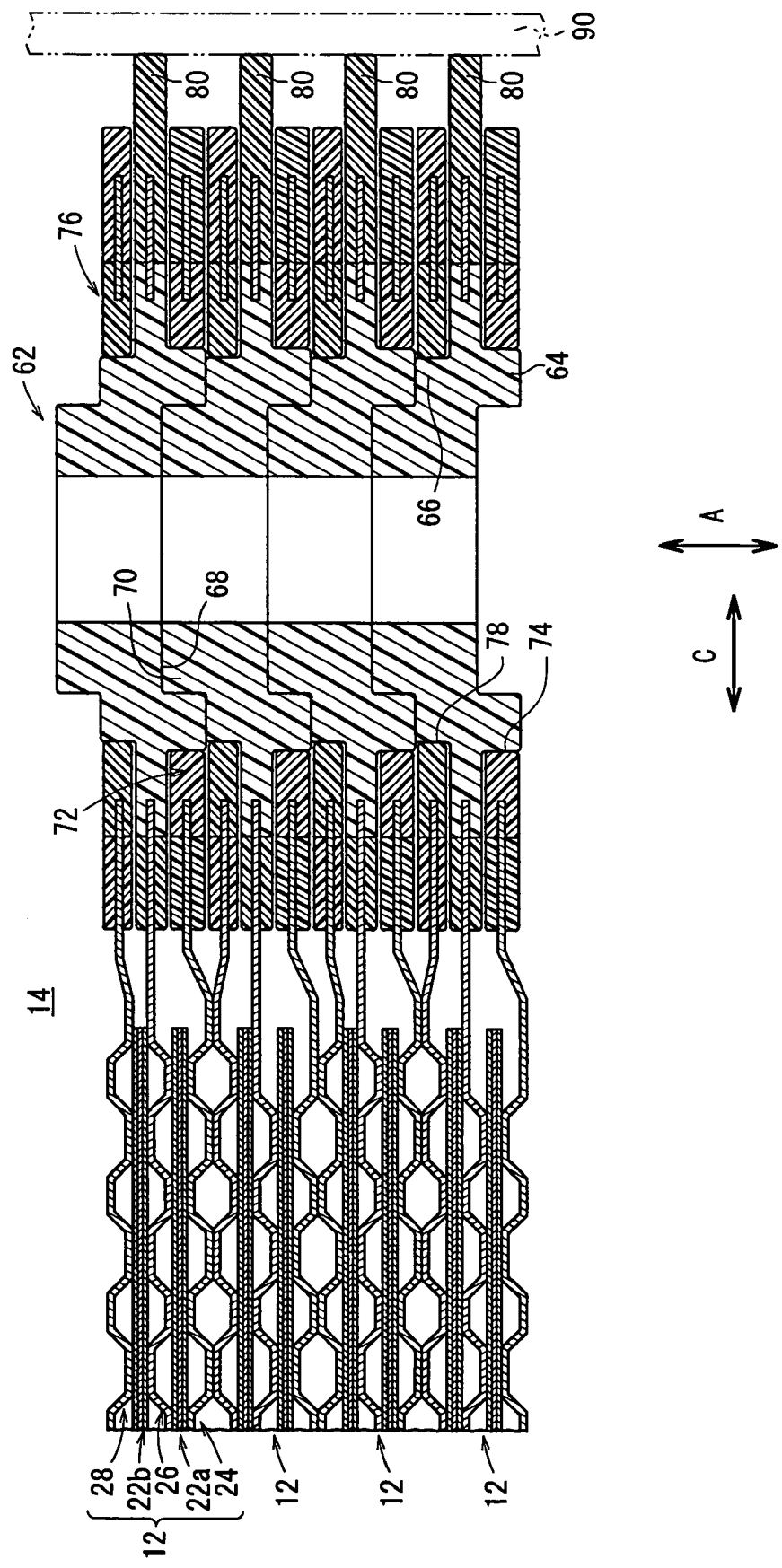
FIG. 6 is a cross sectional view showing a stack of the fuel cell units.

After the fuel cell units 12 are assembled as described above, as shown in FIG. 6, the fuel cell units 12 are stacked together along a guide rail 90. At this time, at each of the fuel cell units 12, the guide 80 expands from the second separator 26 in the direction indicated by the arrow C. The second separator 26 is substantially at the central position of the fuel cell unit 12. Therefore, simply by guiding the guides 80 of fuel cell units 12 along the guide rail 90, the fuel cell units 12 can be stacked together easily with accuracy.

Further, when the fuel cell units 12 are stacked together, the expanded portion 70 of one of the adjacent positioning members 62 is fitted to the hole 68 of the other of the adjacent positioning members 62. Therefore, the fuel cell units 12 are advantageously positioned in alignment with each other easily with accuracy.

Operation of the fuel cell stack 10 will be described below.

Firstly, as shown in FIG. 1, an oxygen-containing gas (air), and a fuel gas such as a hydrogen-containing gas are supplied to the fuel cell stack 10. Further, a coolant such as pure water, an ethylene glycol, or oil is supplied to the fuel cell stack 10.

As shown in FIG. 2, the oxygen-containing gas is supplied to the oxygen-containing gas supply passage 30a of the fuel cell unit 12, and flows in the direction indicated by the arrow A. The oxygen-containing gas flows into the first oxygen-containing gas flow field 46 of the second separator 26 and the second oxygen-containing gas flow field 50 of the third separator 28. The oxygen-containing gas supplied into the first oxygen-containing gas flow field 46 flows along the cathode 40 of the first membrane electrode assembly 22a. The oxygen-containing gas supplied into the second oxygen-containing gas flow field 50 flows along the cathode 40 of the second membrane electrode assembly 22b.

The fuel gas flows from the fuel gas supply passage 32a of the fuel cell unit 12 into the first fuel gas flow field 42 of the first separator 24 and the second fuel gas flow field 48 of the second separator 26. The fuel gas flows along the respective anodes 38 of the first and second membrane electrode assemblies 22a, 22b.

Thus, in the membrane electrode assemblies 22a, 22b, the oxygen-containing gas supplied to the respective cathodes 40, and the fuel gas supplied to the anode 38 are consumed in electrochemical reactions at catalyst layers of the cathodes 40 and the anodes 38 for generating electricity.

Then, the oxygen-containing gas consumed at the respective cathodes 40 flows along the oxygen-containing gas discharge passage 30b, and is discharged from the fuel cell stack 10. Likewise, the fuel gas consumed at the anodes 38 flows along the fuel gas discharge passage 32b, and is discharged from the fuel cell stack 10.

Further, the coolant flows into the coolant flow field 44 between the fuel cell units 12, and flows in the direction indicated by the arrow C. After the coolant cools the first and second membrane electrode assemblies 22a, 22b with skipping, the coolant flows through the coolant discharge passages 34b, and is discharged from the fuel cell stack 10.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell stack comprising:
a fuel cell unit including at least first and second electrolyte electrode assemblies and at least first, second, and third metal separators, said first and second electrolyte electrode assemblies each including a pair of electrodes and an electrolyte interposed between said electrodes, said first separator and said second separator sandwiching said first electrolyte electrode assembly, said second separator and said third separator sandwiching said second electrolyte electrode assembly,
wherein a plurality of the fuel cell units are stacked together to form the fuel cell stack,
wherein said second separator is a single metal plate having a first surface and a second surface opposite the first surface and includes an oxygen-containing gas flow field provided on the first surface of the second separator and a fuel gas flow field provided on the second surface of the second separator; and
a positioning mechanism for positioning said first to third separators in alignment with each other, wherein said positioning mechanism includes:
a first protruded portion protruding from one surface of said second separator toward said first separator;
a second protruded portion protruding from the other surface of said second separator toward said third separator, said first protruded portion and said second protruded portion being made of a resin material, and formed integrally with said second metal separator;
a first recess provided on said first separator such that said first protruded portion is fitted to said first recess; and
a second recess provided on said third separator such that said second protruded portion is fitted to said second recess, wherein surfaces of said first and second recesses are made of a resin material, and said first and second recesses are formed integrally with said first and third metal separators.

2. A fuel cell stack according to claim 1, wherein the size or the shape of said first protruded portion is different from the size or the shape of said second protruded portion.

3. A fuel cell stack according to claim 1, wherein said first and second protruded portions are provided on a positioning member;
the positioning member of one of adjacent fuel cell units has an expanded portion fitted to an opening of the positioning member of the other of the adjacent fuel cell units such that the positioning members are positioned in alignment with each other.

4. A fuel cell stack according to claim 3, wherein said positioning member is provided at each of opposite ends of said fuel cell unit in a longitudinal direction.

5. A fuel cell stack according to claim 3, wherein a guide is provided integrally with one end of said second separator in a longitudinal direction such that said guide protrudes outwardly, and the material of said guide is the same as the material of said positioning member.

* * * * *